United States Patent
Nishimoto et al.

(10) Patent No.: US 6,663,506 B2
(45) Date of Patent: Dec. 16, 2003

(54) GOLF CLUB

(75) Inventors: Tatsuo Nishimoto, Fujisawa (JP); Akira Katahira, Mishima (JP); Masaei Tsurumaki, Tsubame (JP)

(73) Assignees: The Yokohama Rubber Co., Tokyo (JP); Kabushiki kaisha Endo Seisakusho, Niigata-ken (JP)

( * ) Notice: Subject to any disclaimer, the term of this patent is extended or adjusted under 35 U.S.C. 154(b) by 0 days.

(21) Appl. No.: 10/341,189

(22) Filed: Jan. 13, 2003

(65) Prior Publication Data

US 2003/0125131 A1 Jul. 3, 2003

Related U.S. Application Data

(63) Continuation-in-part of application No. 10/027,842, filed on Oct. 19, 2001, now abandoned.

(30) Foreign Application Priority Data

Oct. 19, 2000 (JP) ........................................ 2000-319783

(51) Int. Cl.[7] .............................................. A63B 53/04
(52) U.S. Cl. ........................................ 473/345; 473/345
(58) Field of Search ................................ 473/324, 329, 473/332, 342, 345, 346, 349, 350, 291

(56) References Cited

U.S. PATENT DOCUMENTS

| 4,438,931 A | * | 3/1984 | Motomiya |
| 4,465,221 A | * | 8/1984 | Schmidt |
| 5,261,664 A | * | 11/1993 | Anderson |
| 5,271,621 A | * | 12/1993 | Lo |
| 5,292,129 A | * | 3/1994 | Long |
| 5,482,279 A | * | 1/1996 | Antonious |
| 5,584,770 A | * | 12/1996 | Jensen |
| 5,704,850 A | * | 1/1998 | Shieh |
| 5,709,615 A | * | 1/1998 | Liang |
| 5,993,329 A | * | 11/1999 | Shieh |
| 6,238,300 B1 | * | 5/2001 | Igarashi |
| 6,299,549 B1 | * | 10/2001 | Shieh |

FOREIGN PATENT DOCUMENTS

| JP | 11-114106 | * | 4/1999 |
| TW | 275244 | * | 5/1996 |
| TW | 331159 | * | 5/1998 |

OTHER PUBLICATIONS

Summary Translation of Office Action in Taiwan Patent Appli. No. 90125568.*

* cited by examiner

Primary Examiner—Sabastiano Passaniti
(74) Attorney, Agent, or Firm—Quarles & Brady LLP

(57) ABSTRACT

A golf club which comprises a head which is less deformable by the heat in welding. Separate reinforcing members 12 and 13 are provided on inner surface of a front edge 8A of a crown shell 8. Thus, the front edge 8A side is thickened and then the upper edge 4A of the face shell 4 is joined to the front edge 8A of the crown shell 8, by welding. The front edge 8A of the crown shell 8 is formed with a plurality of projections 11 which are anchored by the upper edge 4A of the face shell 4. The front edge 8A of the crown shell 8 is thickened by adding the thickness of the reinforcing members 12,13 to the thickness of crown shell 8 itself. Thus, thermal deformation and the sinking of the front edge 8A at the time of welding can be prevented, thus enabling the upper edge 4A to be joined to the front edge 8A as designed.

12 Claims, 12 Drawing Sheets

GOLF CLUB

CROSS-REFERENCE TO RELATED APPLICATIONS

This application is a continuation-in-part application of U.S. Ser. No. 10/027,842 filed on Oct. 19, 2001, now abandoned.

BACKGROUND OF THE INVENTION a) Field of the Invention

The present invention relates to a golf club with a head made of a plurality of separate shells, having a shaft connected thereto.

b) Description of the Background Art

Conventionally, in order to produce wood golf club heads or so-called "metal Wood", it is known art to join a plurality of metallic shells together. In those types of heads, respective peripheries of plural metallic shells are integrally welded to one another.

As golf club heads are progressively large-sized, with lower centers of gravity thereof being pursued, respective separate shells for constructing a head also are getting thinner and thinner. For example, in the case that a beta titanium alloy is used, face is normally as thin as 2.5 to 3.0 mm, sole and crown are each as thin as 1 mm or below. When welding such thin separate shell together, there occurs a problem that heat by the welding causes deformation. More specifically, when welding a crown to a face, a front edge of the crown is likely to sink toward the inside. In that case, excessive grinding would be needed as a post-processing to obtain a predetermined configuration, so that the resultant thickness of welded portions becomes too small. As time of striking balls, resulting to a likelihood to cause cracks therein.

On the other hand, whilst the peripheral edges of a plurality of metallic shells are welded together in metal wood golf clubs, welding is performed by abutting the adjacent peripheral edges to one another, so that there is another problem that an excessive amount of welding bead enters inside. Whilst welding bead is to be heaped up in an approximately even manner along the welding advancing direction, if a portion of the welding bead sinks into the inside, then the portion is depressed, and thus another welding bead must be heaped up again. If beads are repeatedly heaped up this way, more welding heat is applied due to the welding, so that the undesirable deformation is more likely to occur. On the other hand, if the excessive welding bead is heaped, then it would be difficult to visually confirm the configuration of parts where respective shells are joined. Further, there would occur a further problem that the applied heat causes a change in strength property of titanium alloy material so that the fragility is increased, thus leading to the possible destruction of the neighborhood of the parts to be welded. Even though non-solution treatment material is used, yet the welding bead is likely to cause deformation to some extent.

Whereas, in paragraphs 0008 to 00010 in Japanese Un-Examined patent publication No 11-114106 is disclosed a method for manufacturing a golf club, wherein in a golf club head comprising a hollow metallic body shell and a face shell joined to an opening of said body shell which is open to the face shell, at least one of an end face of the opening of the body shell or an edge of the face shell is formed with a plurality of projections to be abutted to the other, while beads 15 are buried in recesses formed between the projections, to fix the face shell to the opening of the body shell; and also a method for manufacturing a golf club wherein a welding member is heated while being abutted to the recesses formed between the above projections when abutting the face shell to the head body, so that the welding member is fused to be filled in said recesses, to thereby fix the face shell to the opening of the head body. The prior art teaches that such methods ensure beads to be properly positioned in the recesses between the projections in a position where the body shell and the face shell are joined, without overlapping with the body shell or the face shell, so that the face shell is lightened.

According to the prior art, however, there still remains a problem that when joining respective thin separate shells together by welding, they are deformed due to the heat in welding. Further, the prior art involves a further problem that as one of the members to be abutted is provided with projections, and beads are buried in recesses formed between the projections, excessive amount of welding bead is likely to enter the inside through the recesses.

Further, U.S. Pat. No. 5,482,279 to Antonious discloses a thickened peripheral portion (reinforcing portion) 30, but the prior art fails to disclose anything about the attachment structure associated with the welding of a crown shell. U.S. Pat. No. 5,584,770 to Jensen discloses in its FIG. 30 the provision of a specific skirt 60, and U.S. Pat. No. 5,292,129 to Long et al. also discloses in its FIG. 5 a rib element 42, each of which however only discloses a face shell and a crown shell formed integrally with each other in advance. Therefore, the prior art involves no technical teachings about the attachment structure associated with the welding of the face shell and the crown shell.

Whereas U.S. Pat. No. 5,704,850 to Shieh discloses that a top cover plate 2 is provided with the front projecting blocks 5, while a solder E being provided with the blocks 5 being abutted to the face panel 41. It is to be noted that the distal ends of the blocks 5 are substantially flush with the distal end of the plate 2, with the respective distal ends being abutted to the rear surface of the panel 41, with a solder E being provided in gaps S. According to such golf club head, however, whilst the plate 2 is fixed to the panel 41 in the gaps S, using a solder E, the distal end of the plate 2 itself is only abutted to the rear surface of the panel 41 in other portions than the gaps S, and thus there remains a problem that such structure is unlikely to ensure a sufficient connection strength to withstand the impact caused when a golf ball is struck on the panel 41.

U.S. Pat. No. 6,238,300 to Igarashi discloses that the distal end of the top plate 54 is joined to the upper end of the face plate 56, using a weld bead 64, with the plate portion 52C being disposed on a rear of the face plate 56. According to the prior art, however, the same problem as that of the above-mentioned U.S. Pat. No. 5,704,850 would occur as the plate 54 and the plate 56 the plate 54 and the plate portion 52C are abutted to each other so as to be welded with the weld bead.

Referring o FIG. 7 of U.S. Pat. No. 6,299,549 to Shieh, the head body 10 is provided with the rim 13, and the face plate 20 is provided, as illustrated. According to the structure shown in FIG. 7, yet the tip end of the upper surface of the head body 10 is abutted to the face plate 20, so that the same problem as that of the above-mentioned U.S. Pat. No. 5,704,850 would occur.

Also referring to FIG. 4 of U.S. Pat. No. 5,993,329 to Shieh, the casing 10 is fixed to the lace plate 30 through the coupling block 20, However, the prior art involves no technical teachings about the attachment structure associated with the welding of the face shell and the crown shell in a golf club head made up of a plurality of shells.

Also, it is noted that the blocks 213 disclosed in U.S. Pat. No. 5,709,615 to Liang are positioning elements provided on an edge of the face plate 21. The prior art also involves no technical teachings about the attachment structure associated with the welding of the face shell and the crown shell in a golf club head made up of a plurality of shells.

Referring to U.S. Pat. No. 4,438,931 to Motomiya, the prior art discloses a head constructed of three different shells that are joined together with the respective shells being abutted to one another. The prior art, however, only discloses background art on which the present invention is based, failing to disclose an improved attachment structure associated with the welding of the face shell and the crown shell in this type of a golf club head.

Still further, U.S. Pat. No. 4,465,221 to Schmidt discloses that the sole plate 12 is fixed to the opening 21, but the prior art does not involve any technical teachings about the attachment structure associated with the welding of the face shell and the crown shell in the above-mentioned type of a golf club head. Neither U.S. Pat. No. 5,261,664 to Anderson disclosing the plate 21 fixed to the body portion 20 using the fasteners 24–27 nor U.S. Pat. No. 5,271,621 to Lo disclosing the projection unit 43 that is similar to the thickened peripheral portion 30 of U.S. Pat. No. 5,482,279 to Antonious.

SUMMARY OF THE INVENTION

To eliminate the above problems, it is, therefore, a main object of the present invention to provide a golf club having a head constructed by joining a plurality of metallic shells, and a shaft connected to the head, wherein said head is less likely to be deformed by the heat in welding.

It is another object of the present invention to provide a golf club having a head constructed by joining a plurality of metallic shells, wherein said head is protected from the excessive welding beads entering the inside and excessive heat being applied thereto.

To attain the above objects, there is provided, in accordance with a first aspect of the invention, a golf club, which comprises: a head formed by joining a plurality of separate shells one another, said separate shells including a face shell having an upper edge and a crown shell having a front edge; a shaft connected to said head; a plurality of projections provided on the front edge of said crown shell, each of said projections being laterally spaced from each other, protruding from said front edge by a first projection length that is equal to or slightly less than a thickness of the upper edge of said face shell so that each projection is anchored in such a manner that rests on the upper edge of said face shell, and a reinforcing member provided along the front edge of said crown shell, said reinforcing member being integrally fixed to an inside of the front edge of said crown shell, and protruding from the front edge of said crown shell by a second projection length that is less than said first length so that a distal end of said reinforcing member is positioned on a rear of said face shell, wherein bead is placed between the upper edge of said face shell and the front edge of said crown shell so that welding is performed to weld said separate shells together.

Thus, the front edge of the crown shell is reinforced by the reinforcing member, so that the thermal deformation of the front edge at the time of welding can be prevented, well withstanding such thermal deformation tendency. Further, as welding is performed with the projections being anchored in such a manner that rest on the upper edge of the face shell, the upper edge of the face shell can be welded to the front edge of the crown shell as originally designed, without allowing the front edge from sinking in the inside of the head due to the thermal deformation caused by the welding heat. Furthermore, as the front edge of the reinforcing member that protrude from the front edge of the crown shell is positioned on a rear face of the face shell so as to form the narrow clearance between the right and left reinforcing members, not only can the sinking of the weld bead be reduced but can the better beads be formed.

According to a second aspect of the invention, there is provided a golf club comprising: a head formed by joining a plurality of separate shells one another, said separate shells including a face shell having an upper edge, said upper edge being formed with a flat portion on a front side and a recess on a rear side, and a crown shell having a front edge; a shaft connected to said head; a plurality of projections provided on the front edge of said crown shell, each of said projections being laterally spaced from each other, protruding from said front edge so that each projection is anchored in such a manner that rests on the flat portion of said upper edge of said face shell, and a reinforcing member provided along the front edge of said crown shell, said reinforcing member being integrally fixed to an inside of the front edge of said crown shell, having a distal end positioned rearwardly of said face shell, wherein bead is placed between the upper edge of said face shell and the front edge of said crown shell so that welding is performed to weld said separate shells together.

The structure thus made is particularly advantageous in that better forming of the weld bead is achieved by providing the recess on a rear side of the upper edge of the face shell.

According to a further aspect of the invention, there is provided a golf club set forth in the second aspect, in which said projections, the front edge portion of said reinforcing members and the upper edge of said face shell are integrally welded to one another.

According to the structure, the crown shell can be integrally joined to the face shell through the reinforcing member, thus enhancing connection strength therebetween. Further, a strong and good weld bead can be provided through a single weld stroke.

BRIEF DESCRIPTION OF THE DRAWINGS

Other objects, features and advantages of the invention will be apparent to those skilled in the art from the following description of the preferred embodiments of the invention, wherein reference is made to the accompanying drawings, of which:

FIG. 2a is a section of a golf club according to the first embodiment of the invention, while

FIG. 6a is a section of a golf club according to a third embodiment of the invention, while

FIG. 9a is a section of a golf club prior to being welded according to a fourth embodiment of the invention, while

FIG. 11a is a section of a golf club after being welded according to a fourth embodiment of the invention, while

FIG. 12a is a section of a golf club after being welded according to a fifth embodiment of the invention, while

DESCRIPTION OF PREFERRED EMBODIMENTS

Hereinafter will be described an embodiment of the invention with reference to the attached drawings.

Figure 1:
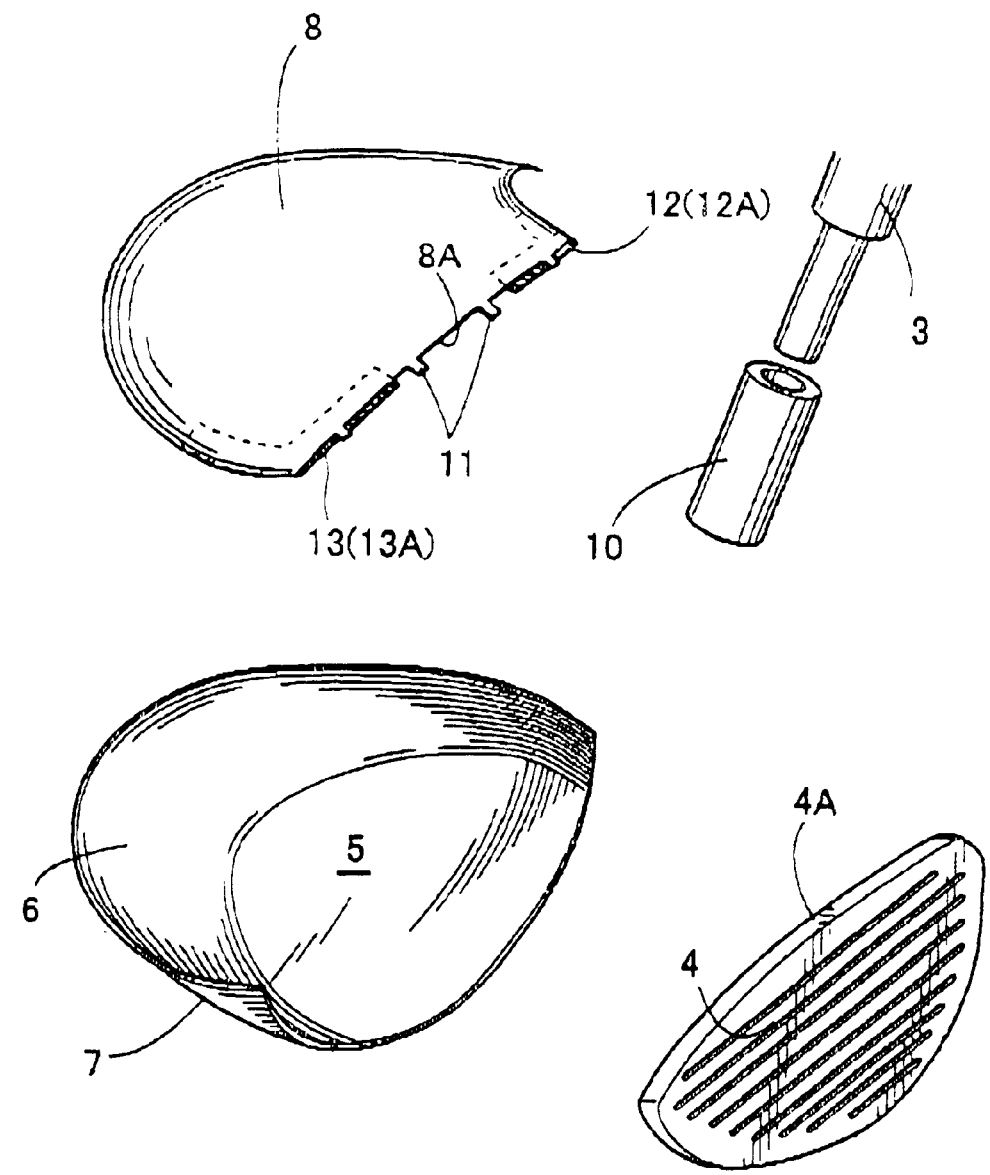
FIG. 1 is an exploded perspective view showing a golf club according to a first embodiment of the invention.
Figure 2B:
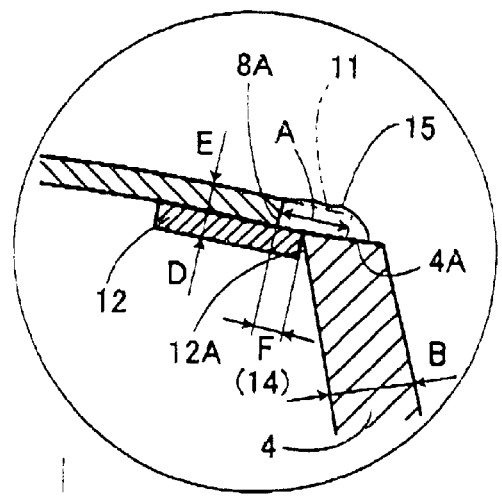
FIG. 2b is an enlarged section thereof.
Figure 2A:
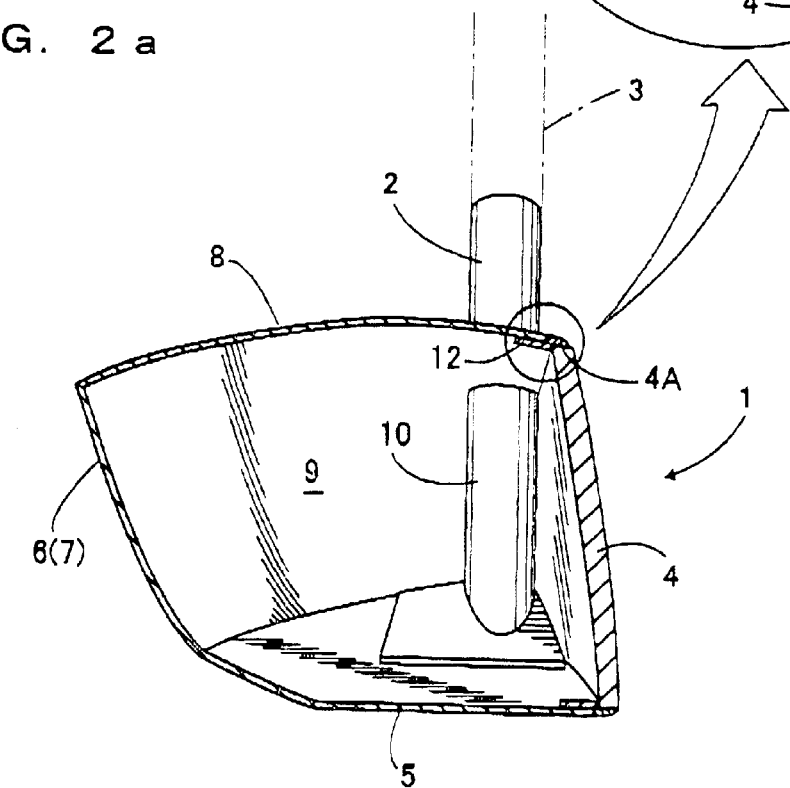
Figure 3:
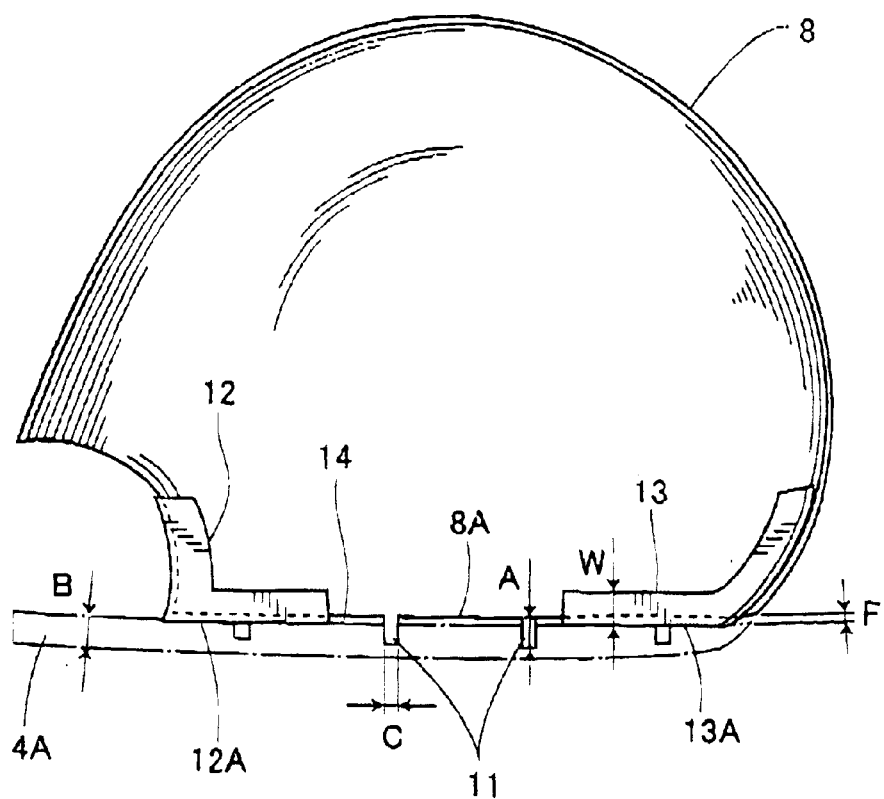
FIG. 3 is a bottom view of a crown shell of a golf club according to the first embodiment of the invention.

In FIGS. 1 to 3 showing a first embodiment of the invention, a metallic wood golf club commonly known as "metal wood club", comprises a head 1 having a hosel 2 serving as a shaft attachment portion and a shaft 3 connected to the hosel 2. The head 1 is integrally formed by joining a plurality of metallic shells together. In the present embodiment, such metallic shells consist of: a face shell 4 on a front; a sole and side-peripheral shell 7 forming a sole 5 and a peripheral side portion 6; and a crown shell 8, which are made of beta type titanium alloy, respectively, and joined together by welding the respective peripheral edges one another. In the meantime, the head 1 has a hollow portion 9 with a shaft attachment pipe 10 disposed therein through the hosel 2, while a lower portion of the shaft 3 is inserted into said pipe 10. The thickness of the crown shell 8 is smaller than that of the sole and peripheral side shell 7, while the thickness of the sole and peripheral side shell 7 is smaller than that of the face shell 4.

The crown shell 8 has a front edge 8A which is formed with a plurality of projections 11, while the face shell 4 has an upper edge 4A so that said projections 11 may be anchored by resting on the upper edge 4A. Each projection 11 has a projection length A of about 2 to 3 mm, which is at most equal to a thickness B of the upper edge 4A of the face shell 4, or otherwise, slightly shorter than the thickness B. while each projection 11 has a width C of about 2 mm for example, which is nearly as wide as the said projection length A. In the embodiment, there are there are four projections 11 laterally spaced from each other.

Further, the front edge 8A of the crown shell 8 has reinforcing members 12 and 13 integrally fixed thereto along the inside of the front edge 8A. These reinforcing members 12 and 13 are provided at right and left sides of the front edge 8A, along the front edge 8A only, each being formed into a thin plate, having a thickness D of about 1 mm for example, approximately equal to a thickness E of the said front edge 8A, while a width W of about 5 mm so that each extends along the front edge 8A. In the embodiment, these reinforcing members 12 and 13 are integrally provided at both sides of the front edge 8A, by spot welding or the like. These reinforcing members 12 and 13 have respective front edges 12A and 13A, which project out from the end of the front edge 8A by a projection length F that is about 1 mm, for example, less than the aforesaid projection length A.

Next, a manufacture method of a golf club according to the invention will be described. The head 1 is integrally constructed by welding the respective edges of the face shell 4, the sole and peripheral side shell 7 and the crown shell 8 one another. Whilst the welding is performed by TIG welding, the sole and peripheral side shell 7 and the crown shell 8 have such small thickness E as thin as about 1 mm or less, as above-mentioned, and thus a value of an electric current for the welding should desirably be set at 40 to 50A that is lower than 80 to 90A for the welding of the face shell 4 having the larger thickness B of 2 to 3 mm or above.

When welding the upper edge 4A of the face shell 4 to the front edge 8A of the crown shell 8, the distal ends of the reinforcing members 12 and 13 are abutted to the rear face of the face shell 4 while the projections 11 are allowed to rest on the upper edge 4A of the face shell 4, thereby locking the former shell relative to the latter shell. By arranging the face shell 4 and the crown shell 8 this way, a clearance 14 of about 1 mm, for example, is formed between the rear face of the face shell 4 and the front edge 8A of the crown shell 8 in these reinforcing members 12 and 13. Then, welding is performed in such a manner that weld bead 15 is placed between the upper edge 4A of the face shell 4 and the front edge 8A of the crown shell 8 so that welding is finished through one welding stroke. Thus, the aforesaid projections 11, the font edge 12A of the reinforcing members 12 and the upper edge 4A of the face shell 4 can be integrally welded, together with the front edge 8A of the crown shell 8, using the weld bead 15, through a single welding stroke.

At this moment, even though the front edge 8A of the crown shell 8 is subjected to the welding heat so that it is exposed to the risk of thermal deformation, yet the front edge 8A is reinforced by the reinforcing members 12 and 13, so that it can withstand such thermal deformation and prevent the deformation. Further, as welding is performed with the projections 11 being anchored in such a manner that rests on the upper edge 4A of the face shell 4, the front edge 8A can be prevented from sinking into the inside of the head 1 by the thermal deformation, whereby the upper edge 4A of the face shell 4 can be welded to the front edge 8A of the crown shell 8 as originally designed. Additionally, as the front edges 12A, 13A of the reinforcing members 12, 13 protruding from the front edge 8A of the crown shell 8 are abutted to the rear surface of the face shell 4 to thereby form the narrow clearance 14 between the laterally paired reinforcing members 12 and 13, the reduced amount of the sinking weld bead 15 as well as the better formation of the weld bead 15 can be achieved.

As is apparent from the foregoing, according to the foregoing embodiment of the invention, there is provided a golf club comprising the head 1 and the shaft 3 connected thereto, said head 1 consisting of the face shell 4; the sole and side-peripheral shell 7 forming the sole 5 and the peripheral side portion 6; and the crown shell 8, wherein the reinforcing members 12 and 13 are provided partly along the front edge 8A of the crown shell 8 so as to thicken the front edge 8A side of the crown shell 8 by adding the thickness D of the reinforcing members 12 and 13 to its thickness E, and then welding is performed, whereby thermal deformation at the time of welding can be prevented.

Whereas, in order to enlarge a sweet area, the center of gravity (hereinafter called C.G., not shown in the drawings) of the head 1 must be lowered and the depth of the C.G., defined as a distance between the C.G. of the head and the face shell 4, must be prolonged, and thus the crown shell 8 must be formed thin. According to the embodiment of the invention, however, only the front edge 8A of the crown shell 8 is formed thick, so that the thermal deformation at the time of welding can be prevented, even though the crown shell 8 is formed thin as a whole.

Further, the front edge 8A of the crown shell 8 is provided on a part of its inner surface with the separate reinforcing members 12, 13 so that the front edge 4A of the face shell 4 and the front edge 8A of the crown shell 8 can be welded to each other with the crown shell 8 being comparatively thickened at the front edge 8A side, whereby the front edge 8A of the crown shell 8 can have an increased thickness by adding the thickness D of the reinforcing members 12, 13 to its thickness E, thereby preventing the thermal deformation at the time of welding. Specifically, as the separate reinforcing members 12, 13 are fixed to the inner surface of the front edge 8A of the crown shell 8, scrap pieces produced when forming the respective shells 4,7 and 8 can be used therefor, while if these reinforcing members 12 and 13 are formed thin in advance, to the preset small thickness D, the front edge 8A of the crown shell 8 can be formed to the preset thickness of "E+D". Furthermore, as the reinforcing members 12 and 13 are separate from the crown shell 8, they can be easily arranged in any position on the crown shell 8 you like, while as the reinforcing members 12 and 13 are only arranged along the front edge 8A of the crown shell 8, they can be reduced to a minimized size to be lightened, thus minimizing the influence on the weight distribution of the head 1.

Additionally, the front edges 12A and 13A of the said reinforcing members 12 and 13 are allowed to protrude from the front edge 8A of the crown shell 8 with the front edge 8A side being thickened (E+D), and that the upper edge 4A of the face shell 4 and the front edge 8A of the crown shell 8 are joined to each other by welding, with the distal ends of the front edges 12A and 13A being abutted to the rear surface of the face shell 4, whereby there can be formed the narrow clearance 14 of a preset small dimension, between the rear surface of the face shell 4 and the front edge 8A of the crown shell 8, thus enabling better weld bead 15 to be formed.

In addition to the foregoing, as the welding of the upper edge 4A of the face shell 4 to the front edge 8A of the crown shell 8 is performed with the plural projections 11 provided on the front edge 8A of the crown shell 8 being anchored by the upper edge 4A of the face shell 4, the front edge 8A can be prevented from sinking at the time of welding, so that it is possible to weld the upper edge 4A to the front edge 8A as originally designed.

Still also, as the aforesaid projections 11, the font edge 12A of the reinforcing members 12 and the upper edge 4A of the face shell 4 can be integrally welded, using the weld bead 15, through a single welding stroke, the crown shell 8 and the face shell 4 can be joined together by means of the reinforcing members 12 so that the connection strength can be enhanced. while providing the desirable strengthening weld bead 15 through a single welding stroke.

Figure 4:
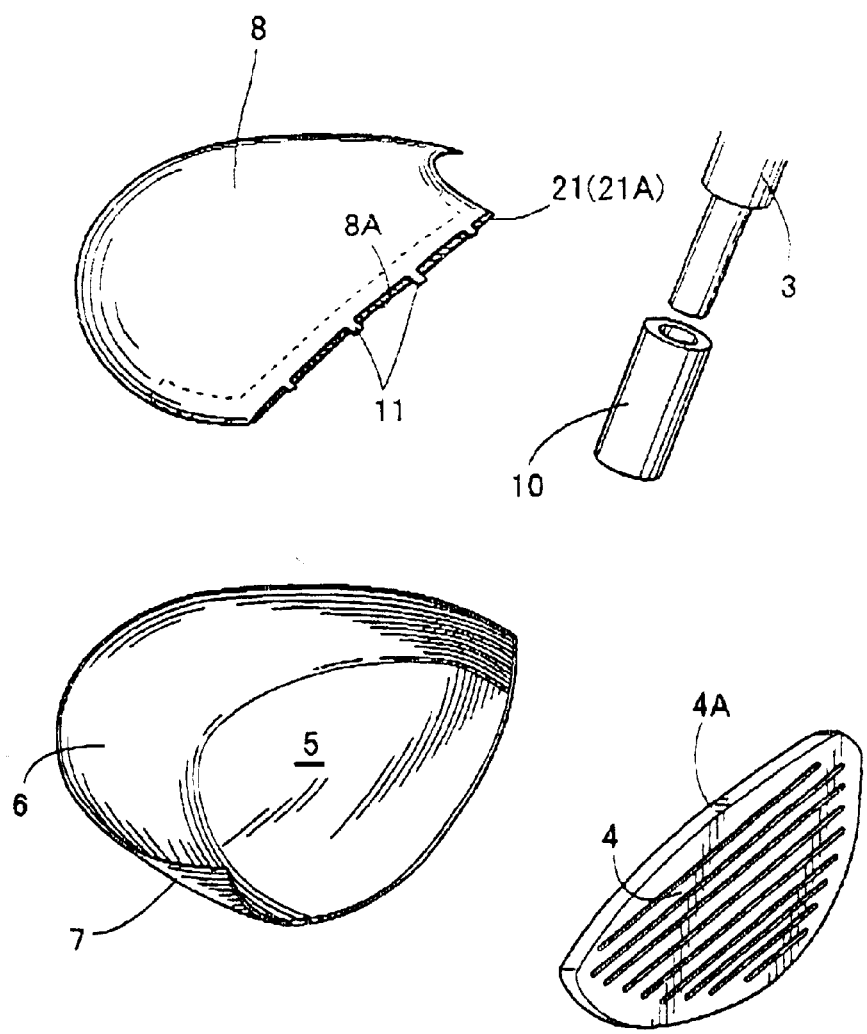
FIG. 4 is an exploded perspective view showing a golf club according to a second embodiment of the invention.
Figure 5:
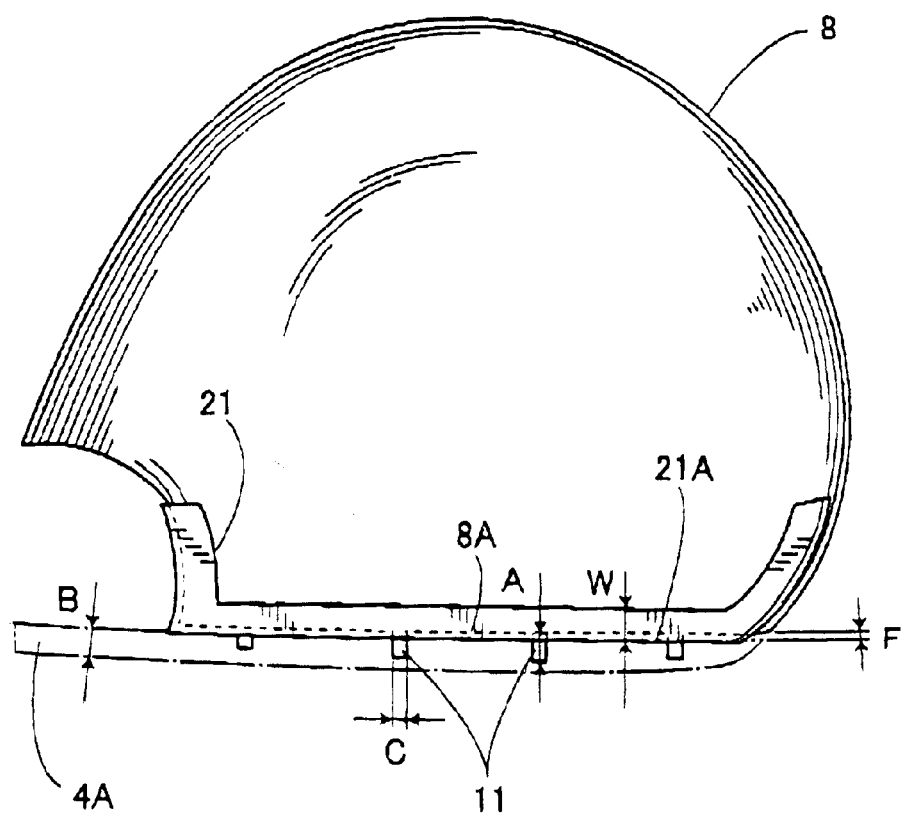
FIG. 5 is a bottom view of a crown shell of a golf club according to the second embodiment of the invention.
Figure 6B:
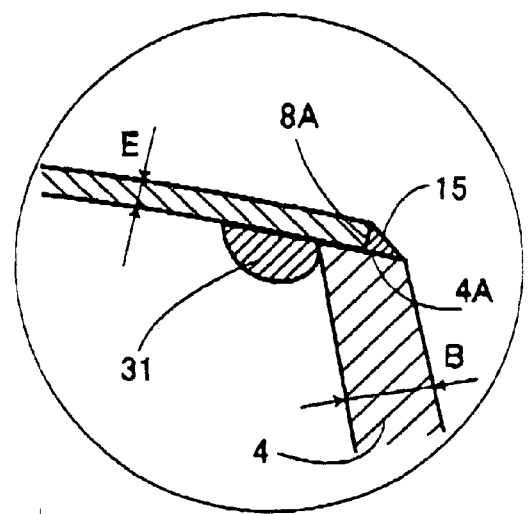
FIG. 6b is an enlarged section thereof.
Figure 6A:
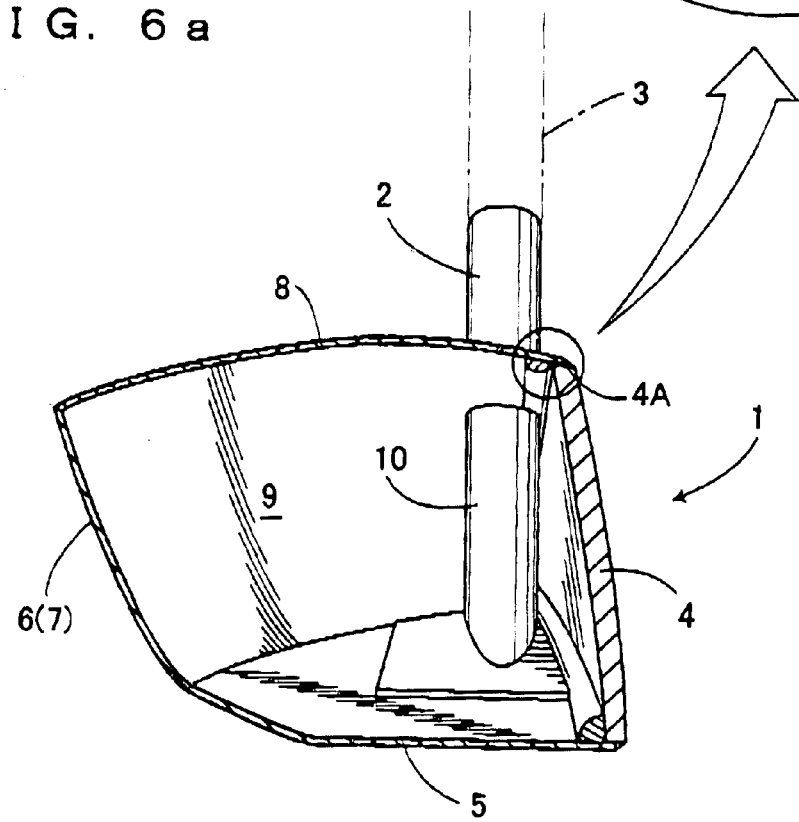
Figure 7:
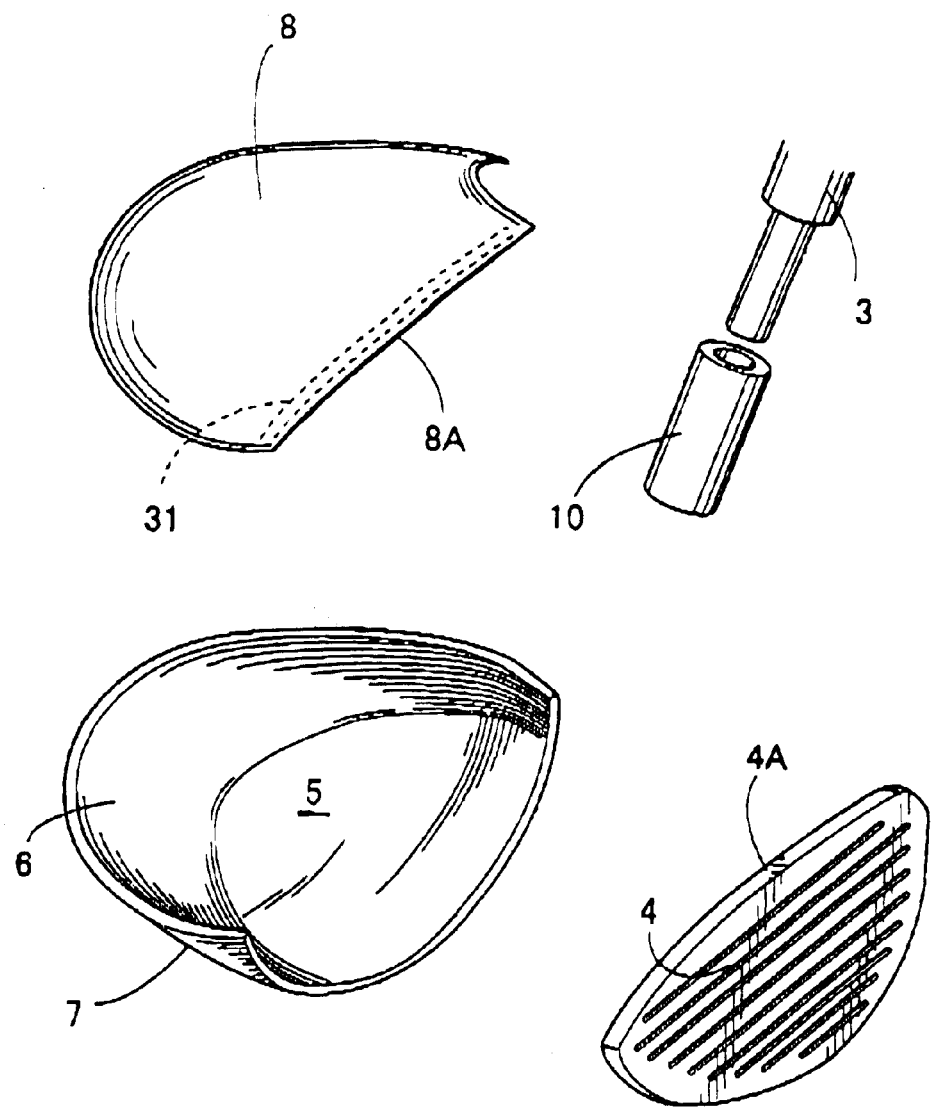
FIG. 7 is an exploded perspective view showing a golf club according to the third embodiment of the invention.
Figure 8:
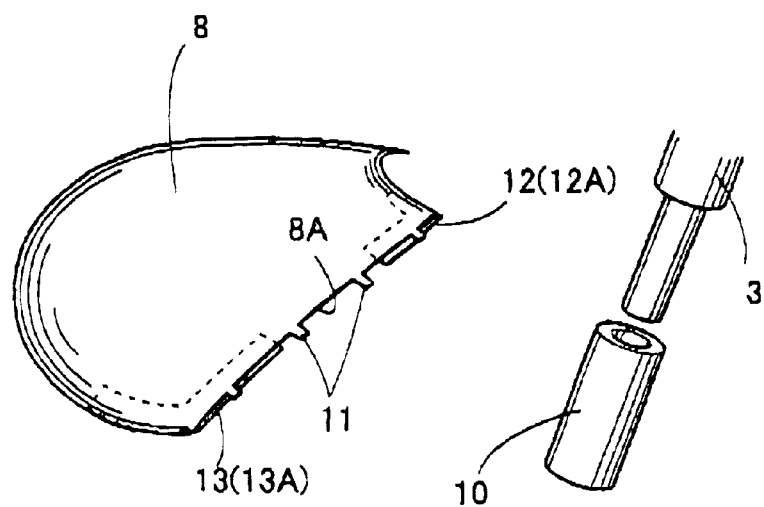
FIG. 8 is an exploded perspective view showing a golf club according to a fourth embodiment of the invention.
Figure 8:
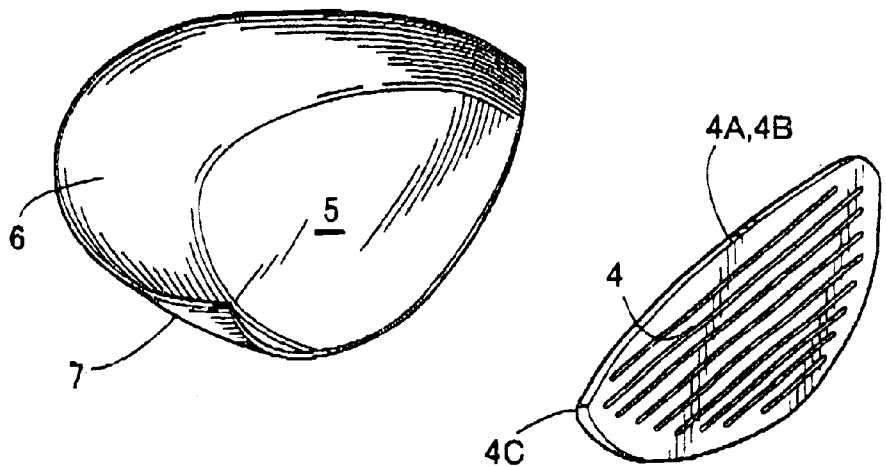
Figure 11B:
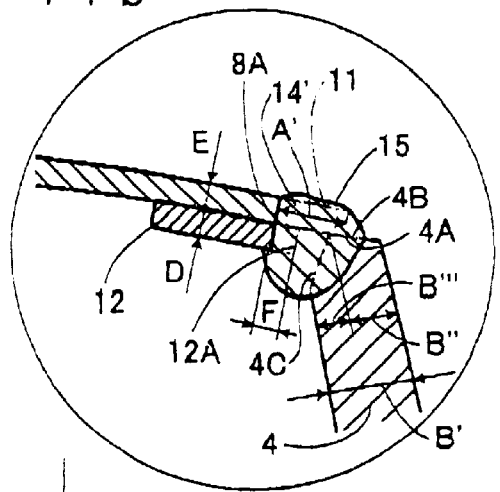
FIG. 11b is an enlarged section thereof.
Figure 11A:
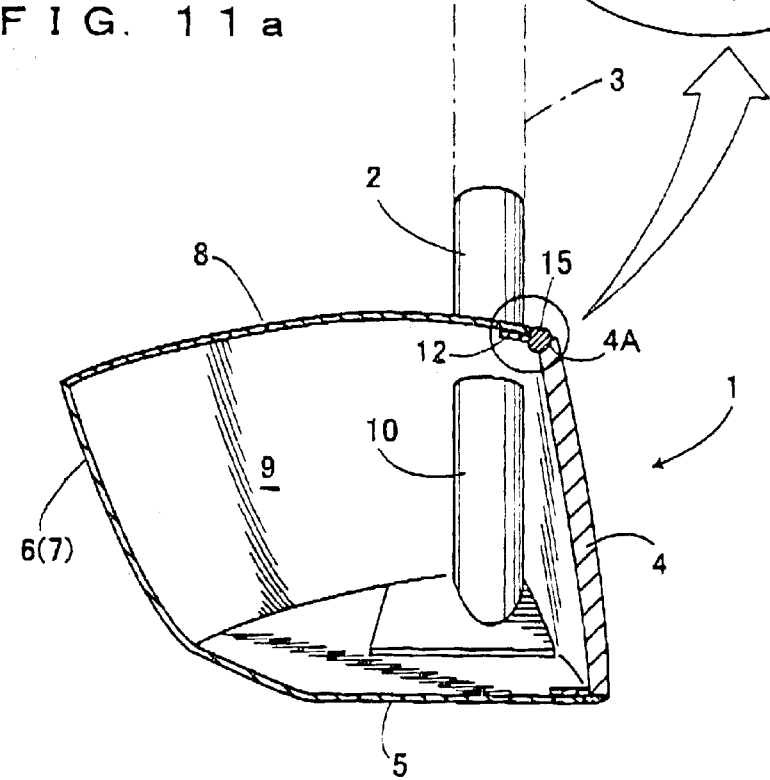
Figure 12B:
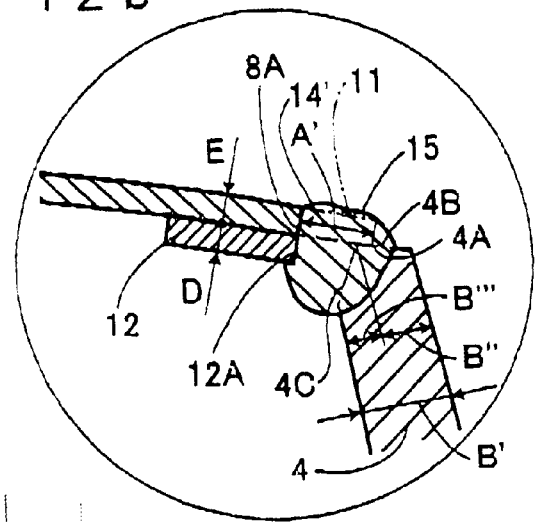
FIG. 12b is an enlarged section thereof.
Figure 12A:
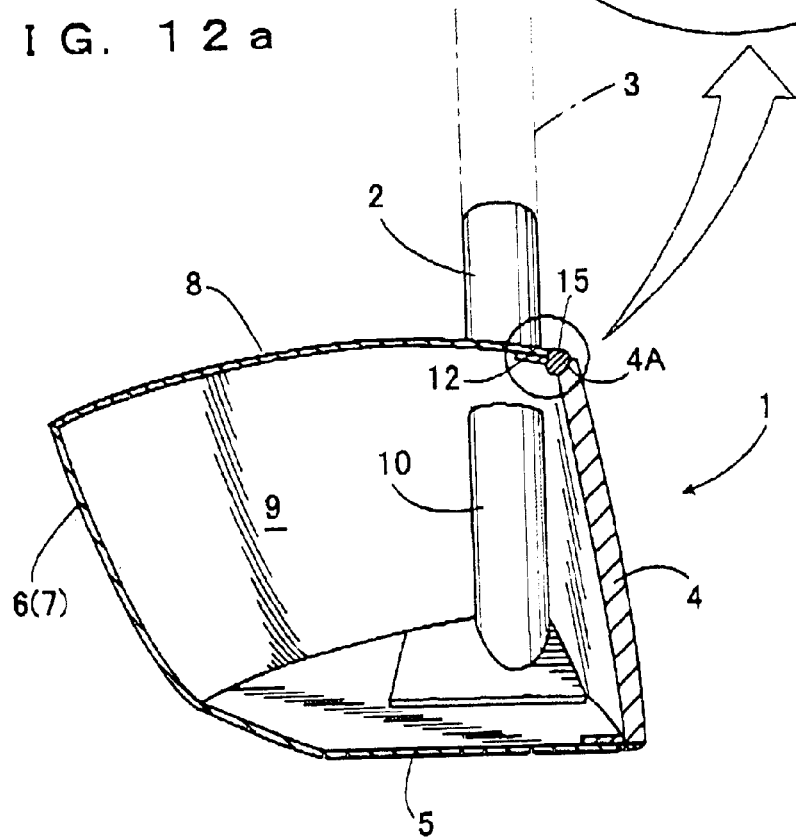

In FIGS. 4 and 5 showing a second embodiment of the invention, in FIGS. 6 and 7 showing a third embodiment thereof, in FIGS. 8 to 11 showing a fourth embodiment thereof and in FIG. 12 showing a fifth embodiment of the invention, the same portions as those described in the foregoing embodiment will be designated by the same reference numerals, and their repeated detailed descriptions will be omitted.

In the second embodiment, a reinforcing member 21 is integrally fixed to the inside of the front edge 8A of the crown shell 8 along the edge thereof. This reinforcing member 21 is disposed along an entirety of the front edge 8A, i.e., continuously from one side of the front edge 8A to the other side thereof, having a thickness of about 1 mm, for example, which is nearly as thin as the front edge 8A, and a width of about 5 mm. In the present embodiment, the reinforcing member 21 is integrally provided by spot welding at both sides of the front edge 8A, having a front edge 21A protruding from the front edge 8A. The projection length of the reinforcing member 21 is about 1 mm, for example, which is smaller than that of the projection Accordingly, when welding the upper edge 4A of the face shell 4 to the front edge 8A of the crown shell 8, the distal end of the reinforcing member 21 is abutted to the rear face of the face shell 4 while the projections 11 are allowed to rest on the upper edge 4A of the face shell 4, thereby anchoring the former to the latter. After that, weld bead 15 is placed between the upper edge 4A of the face shell 4 and the front edge 8A of the crown shell 8, to thereby perform the welding. As discussed above, even though the front edge 8A of the crown shell 8 is subjected to the welding heat so that it is exposed to the risk of thermal deformation, yet the front edge 8A is reinforced by the reinforcing member 21, so that it can withstand such thermal deformation and prevent the deformation. Further, as welding is performed with the projections 11 resting on the upper edge 4A of the face shell 4, the front edge 8A can be prevented from sinking into the inside of the head 1, when welding the upper edge 4A of the face shell 4 to the front edge 8A of the crown shell 8.

As is apparent from the foregoing, the second embodiment also is advantageous in that thermal deformation at the time of welding can be prevented like the first embodiment, and specifically advantageous in that as the reinforcing member 21 is provided along the entire length of the front edge 8A, it can be reinforced in an entire region of the front edge 8A.

In the third embodiment, cladding 31 is integrally provided in advance on the inside face of the front edge 8A of the crown shell 8, said cladding 31 being provided along the edge 8A only. The cladding 31 is provided by putting weld bead, along a part or entire length of the front edge 8A, having a thickness of about 1 mm, for example, nearly as thin as the front edge 8A, and a width of about 5 mm.

Accordingly, when welding the upper edge 4A of the face shell 4 to the front edge 8A of the crown shell 8, the upper edge 4A of the face 4 is abutted to the front edge 8A of the crown shell 8, and then, welding is carried out with the weld bead 15 being placed between the upper edge 4A and the front edge 8A. Thus, the front edge 8A can be reinforced by the cladding 31 when the front edge 8A side is exposed to the risk of thermal deformation by the welding heat.

Specifically, in a golf club comprising the head 1 having the shaft 3 connected thereto, said head 1 being integrally formed by joining the face shell 4; the sole and side-peripheral shell 7; and the crown shell 8, the front edge 8A of the crown shell 8 is partly or entirely provided with the cladding 31, so that the front edge 8A side of the crown shell 8 is formed thicker by adding the thickness of the cladding 31 to the thickness of the front edge 8A, whereby the thermal deformation can be prevented like in the first embodiment.

Also, as the cladding 31 is disposed along only the front edge 8A of the crown shell 8, the cladding 31 can be reduced to a minimum in volume, and lightened, without uselessly disposing it where it actually is not necessary, thus minimizing the influence on the weight distribution of the head 1.

Still also, as the cladding 31 by welding is provided so as to thicken the front edge 8A side of the crown shell 8, it suffices to add the cladding step to the welding process as a preliminary treatment prior to welding the face shell 4 to the crown shell 8, said cladding step being simply providing the cladding 31 in a desired position along the front edge 8A of the crown shell 8.

Next is a description of a fourth embodiment of the invention. The head 1 is integrally formed by joining a plurality of metallic shells together. Like the foregoing embodiments, such metallic shells consist of: the face shell 4 on a front; the sole and side-peripheral shell 7 forming the sole 5 and the peripheral side portion 6; and the crown shell 8, which are made of beta type titanium alloy, respectively, and joined together by welding the respective peripheral edges one another. The thickness of the crown shell 8 is smaller than that of the sole and peripheral side shell 7, while the thickness of the sole and peripheral side shell 7 is smaller than that of the face shell 4.

The crown shell 8 has the front edge 8A which is formed with a plurality of the projections 11, while the face shell 4 has the upper edge 4A so that said projections 11 may be anchored by resting on the upper edge 4A. In a preferred form of the embodiment, the number of the projections 11 is four or five, though it depends on the size of the head 1. The upper edge 4A is formed on its front or outer side with a substantially horizontal flat surface 4B, while the upper edge 4A is formed on its rear or inner side with a tapered surface 4C that is a beveled portion, inclined at about 45 degrees, forming a step portion on a rear side of the face 4.

Figure 9B:
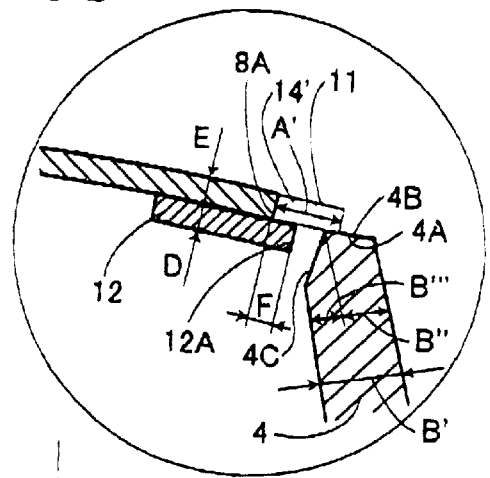
FIG. 9b is an enlarged section thereof.
Figure 9A:
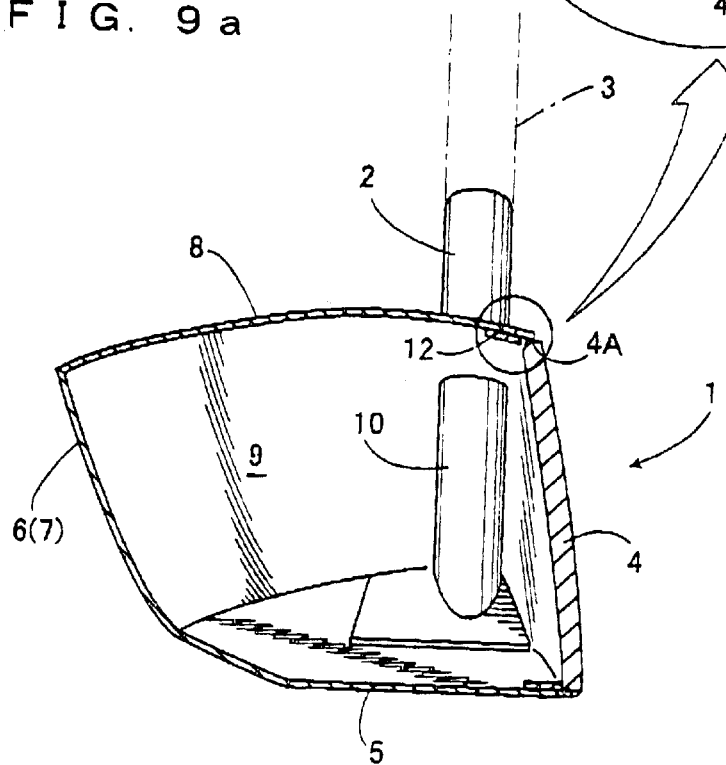
Figure 10:
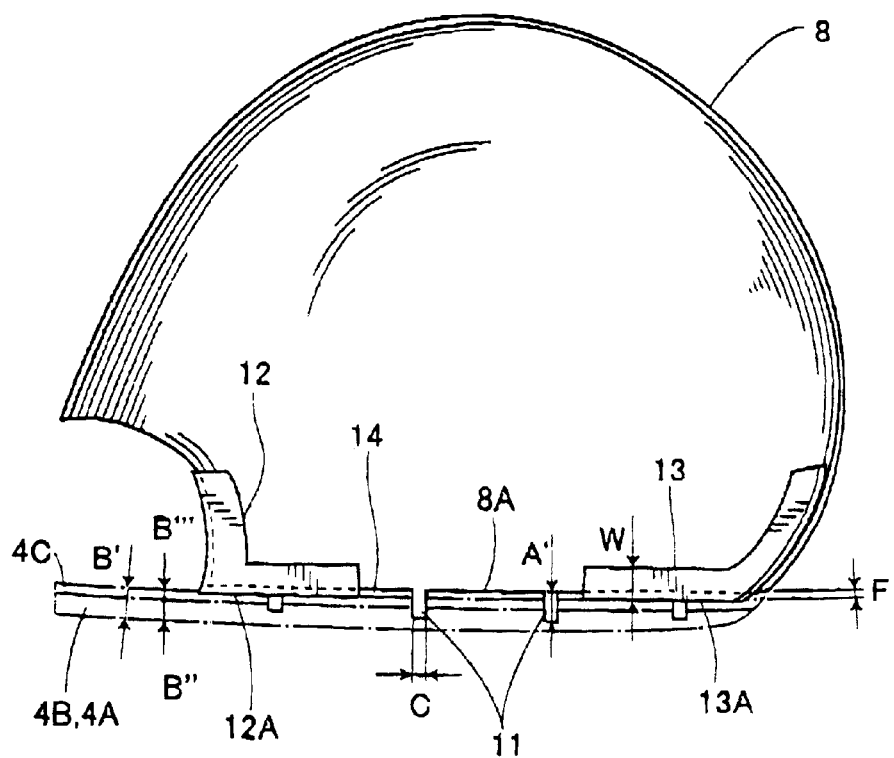
FIG. 10 is a bottom view of a crown shell of a golf club according to the fourth embodiment of the invention.

Each projection 11 has a projection length A' ranging from about 1 to 5 mm, preferably from about 1.5 to 3 mm, most preferably from about 2 to 3 mm, of which the tip end is able to rest upon the flat surface 4B of the face shell 4 without protruding outside from an outer edge of the flat surface 4B. A thickness B' of the upper edge 4A of the face shell 4 is about 2 to 4 mm, preferably about 2.5 to 2.8 mm. In the case that the thickness B' is about 2.5 to 2.8 mm a thickness B" of the said flat surface 4B is at least one third of the said thickness B', in plan view as illustrated in FIG. 9b. More specifically, if the thickness B" is 1.5 mm and the tapered surface 4C is viewed from above, the thickness B'" of the tapered surface 4C in plan view is less than two thirds of the thickness B', but more than one tenth thereof, or preferably in a range of from 1.0 mm to 1.3 mm. In a preferred form of the invention, a distance between the front edge 8A of the crown shell 8 and the flat surface 4B at the time of assembly is set to range from about 0.5 to 1.0 mm. In other words, the distance defined between the front edge 8A of the crown shell 8 and a corner defined by the flat surface 4B and the tapered surface 4C is set to range from about 0.5 to 1.0 mm.

Further, the front edge 8A of the crown shell 8 has the reinforcing members 12 and 13 integrally fixed thereto along the inside of the front edge 8A. These reinforcing members 12 and 13 are provided at right and left sides of the front edge 8A, along the front edge 8A only, each being formed into a thin plate, having a thickness D of about 1 mm for example, approximately equal to the thickness E of the said front edge 8A, while the width W of about 5 mm so that each extends along the front edge 8A. In the embodiment, these reinforcing members 12 and 13 are integrally provided at both sides of the front edge 8A, by spot welding or the like, but they may be integrally provided entirely along the front edge 8A. These reinforcing members 12 and 13 have respective front edges 12A and 13A, which may project out from the end of the front edge 8A by the projection length F that is about 1 mm, for example, preferably 0.5 mm, less than the aforesaid projection length A, as illustrated in FIG. 11b, or otherwise may be flush with the end of the front edge 8A, as illustrated in FIG. 12b showing a fifth embodiment.

Next, a manufacture method of a golf club according to the present embodiment will be described. The head 1 is integrally constructed by welding the respective edges of the face shell 4, the sole and peripheral side shell 7 and the crown shell 8 one another. Whilst the welding is performed by TIG welding, the sole and peripheral side shell 7 and the crown shell 8 have such small thickness E as thin as about 1 mm or less, as above-mentioned, and thus a value of an electric current for the welding should desirably be set at 40 to 50A that is lower than 80 to 90A for the welding of the face shell 4 having the larger thickness B of 2 to 3 mm or above.

When welding the upper edge 4A of the face shell 4 to the front edge 8A of the crown shell 8, the front edges 12A and 13A of the reinforcing members 12 and 13 are disposed rearwardly of the face shell 4 while the projections 11 are allowed to rest on the flat surface 4B of the upper edge 4A of the face shell 4, thereby locking the former shell relative to the latter shell. By arranging the face shell 4 and the crown shell 8 this way, a clearance 14' is formed among the flat surface 4B of the face shell 4, the tapered surface 4C thereof and the front edge 8A of the crown shell 8 in these reinforcing members 12 and 13.

First, the projections 11 themselves are fused without using a weld rod, so that the projections 11 are spot welded to the face shell 4. Then, welding process is performed in such a manner that the weld bead 15 is placed between the upper edge 4A of the face shell 4 and the front edge 8A of the crown shell 8. It should be noted herein that the front edges 12A and 13A of the plate-like reinforcing members 12 and 13 are fused together when the weld bead 15 is placed. Accordingly, the projections 11, the font edges 12A, 13A of the reinforcing members 12, 13 and the upper edge 4A of the face shell 4 can be integrally welded, together with the front edge 8A of the crown shell 8, using the weld bead 15, through a single welding stroke.

At this moment, even though the front edge 8A of the crown shell 8 is subjected to the welding heat so that it is exposed to the risk of thermal deformation, yet the front edge 8A is reinforced by the reinforcing members 12 and 13, so that it can withstand such thermal deformation and prevent the deformation. Further, as welding is performed with the projections 11 being anchored in such a manner that rests on the upper edge 4A of the face shell 4, the front edge 8A can be prevented from sinking into the inside of the head 1 by the thermal deformation, whereby the upper edge 4A of the face shell 4 can be welded to the front edge 8A of the crown shell 8 as originally designed. Additionally, as the front edges 12A, 13A of the reinforcing members 12, 13 protruding from the front edge 8A of the crown shell 8 are disposed rearwardly of the face shell 4 to thereby form the narrow clearance 14 among the laterally paired reinforcing members 12 and 13 and the tapered surface 4C, the volume of the weld bead 15 can be increased, fusing the front edges 12A, 13A of the reinforcing members 12, 13.

Moreover, as the projections 11 are not allowed to protrude out of the face shell 4, it is not necessary to perform any post treatment to remove unnecessary protruding portions after fixing the projections 11 to the upper edge 4 of the face shell 4. Additionally, the reinforcing members 12 and 13 have respective front edges 12A and 13A projected out from the end of the front edge 8A by the projection length F less than the projection length A of the projections 11, so that the respective front edges 12A, 13A of the reinforcing members 12 and 13 can be disposed easily in a better position relative to the face shell 4. In addition to the foregoing, as the projections 11, the font edge 12A of the reinforcing member 12 and the upper edge 4A of the face shell 4 are integrally welded, together with the front edge 8A of the crown shell 8, using the weld bead 15, through a single welding stroke, it is possible to enhance connection strength between the crown shell 8 and the face shell 4, through the reinforcing members, while providing such good and stiffening beads 15 through a single welding stroke.

Incidentally, the present invention should not be limited to the foregoing embodiments, but may be modified within the scope of the invention. For example, the present invention may apply to the welding between other shells than the face shell and the crown shell.

What is claimed:

1. A golf club comprising:
   a head formed by joining a plurality of separate shells to one another, said separate shells to including a face shell having an upper edge and a crown shell having a front edge;
   a shaft connected to said head;
   a plurality of projections provided on the front edge of said crown shell, each of said projections being laterally spaced from each other, protruding from said front edge by a first projection length that is equal to or slightly less than a thickness of the upper edge of said face shell so that each projection is anchored in such a manner that rests on the upper edge of said face shell, and
   a reinforcing member provided along the front edge of said crown shell, said reinforcing member being integrally fixed to an inside of the front edge of said crown shell, and protruding from the front edge of said crown shell by a second projection length that is less than said first length so that a distal end of said reinforcing member is positioned on a rear of said face shell,
   wherein a bead is placed between the upper edge of said face shell and the front edge of said crown shell so that welding is performed to weld said separate shells together.

2. A golf club according to claim 1, wherein said separate shells include a sole and peripheral side shell other than said crown shell and face shell so that the thickness of said crown shell is smaller than that of said sole and peripheral side shell, while the thickness of said sole and peripheral side shell is smaller than that of said face shell.

3. A golf club according to claim 2, wherein said reinforcing member is provided at right and left sides of the front edge of said crown shell, along the same front edge only, each being formed into a thin plate, having a thickness approximately equal to that of the front edge of said crown shell.

4. A golf club according to claim 3, wherein a clearance of about 1 mm is formed between a rear face of said face shell and the front edge of said crown shell between said reinforcing members provided at the right and left sides, while welding is performed by placing the weld bead in the clearance.

5. A golf club according to claim 3, wherein said plurality of separate shells consist of said face shell on a front, said crown shell and said sole and peripheral side shell, said sole and peripheral side shell being formed with a sole portion and a peripheral side portion.

6. A golf club according to claim 4, wherein said welding is TIG welding.

7. A golf club according to claim 1, wherein said projections, the front edge of said reinforcing members and the front edge of said face shell are integrally welded to one another.

8. A golf club comprising:
   a head formed by joining a plurality of separate shells to one another, said separate shells including a face shell having an upper edge, said upper edge being formed with a flat portion on a front side and a recess on a rear side, and a crown shell having a front edge;
   a shaft connected to said head;
   a plurality of projections provided on the front edge of said crown shell, each of said projections being laterally spaced from each other, protruding from said front edge so that each projection is anchored in such a manner that rests on the flat portion of said upper edge of said face shell, and
   a reinforcing member provided along the front edge of said crown shell, said reinforcing member being integrally fixed to an inside of the front edge of said crown shell, having a distal end positioned rearwardly of said face shell,
   wherein a bead is placed between the upper edge of said face shell and the front edge of said crown shell so that welding is performed to weld said separate shells together.

9. A golf club according to claim 8, wherein said recess comprises a tapered surface.

10. A golf club according to claim 9, wherein none of said projections protrude outside of said face shell.

11. A golf club according to claim 10, wherein said projections protrude from the front edge of said crown shell by a first projection length, while said reinforcing member protrudes from the front edge of said crown shell by a second projection length that is shorter than said first projection length.

12. A golf club according to claim 8, wherein said projections, the front edge portion of said reinforcing members and the upper edge of said face shell are integrally welded to one another.

* * * * *

UNITED STATES PATENT AND TRADEMARK OFFICE
CERTIFICATE OF CORRECTION

PATENT NO.    : 6,663,506 B2
DATED         : December 16, 2003
INVENTOR(S)   : T. Nishimoto, A. Katahira and M. Tsurumaki It is certified that error appears in the above-identified patent and that said Letters Patent is hereby corrected as shown below:

Column 11,
Line 14, change "shells to including" to -- shells including --.
Line 36, change "As time" to -- As a result, a golf club head thus produced is likely to become irresistible to impact at the time --.

Column 5,
Line 49, change "there are there are" to -- there are --.

Signed and Sealed this

Thirteenth Day of July, 2004

JON W. DUDAS
*Acting Director of the United States Patent and Trademark Office*